United States Patent
Anderson

(10) Patent No.: US 8,325,009 B2
(45) Date of Patent: Dec. 4, 2012

(54) STAND ALONE BLUE TOOTH ENABLED CAR DOOR UNLOCKER MODULE

(76) Inventor: Albert Virgil Anderson, Houston, TX (US)

( * ) Notice: Subject to any disclaimer, the term of this patent is extended or adjusted under 35 U.S.C. 154(b) by 1193 days.

(21) Appl. No.: 12/077,917

(22) Filed: Mar. 24, 2008

(65) Prior Publication Data

US 2009/0237206 A1 Sep. 24, 2009

(51) Int. Cl.
- G05B 19/00 (2006.01)
- G05B 11/01 (2006.01)
- B60R 25/10 (2006.01)

(52) U.S. Cl. ............ 340/5.72; 340/426.13; 340/426.14; 340/426.15; 340/426.16; 340/426.17; 340/12.22; 340/12.34

(58) Field of Classification Search .............. 340/5.72, 340/5.64, 5.61–5.62, 13.34, 13.35, 12.22, 340/426.13–426.17; 455/41.2, 95, 99, 404.1; 70/256–257

See application file for complete search history.

(56) References Cited

U.S. PATENT DOCUMENTS

| | | | |
|---|---|---|---|
| 6,161,005 A | 12/2000 | Pinzon | 455/403 |
| 7,894,810 B2 * | 2/2011 | Feher | 455/420 |
| 2004/0264430 A1 | 12/2004 | Wonak et al. | 370/338 |
| 2005/0186860 A1 | 8/2005 | Lorenz et al. | 439/857 |
| 2007/0024442 A1 | 2/2007 | Jolley et al. | 340/542 |
| 2008/0242229 A1 | 10/2008 | Sharma | 455/41.3 |
| 2009/0088076 A1 | 4/2009 | Mercurio et al. | 455/41.2 |

* cited by examiner

*Primary Examiner* — Benjamin C Lee
*Assistant Examiner* — Christopher Gaines
(74) *Attorney, Agent, or Firm* — Kenneth A. Roddy

(57) ABSTRACT

An unlocking device for automobiles that is able to be mounted on the interior of an automobile's rear window to facilitate reentry inside the automobile once a driver is locked out. The unlocking device is rectangular in shape and is mounted on the glass with suction cups. It is a stand alone module that is non evasive of the oem electronics of the automobile. The device is designed to receive dtmf tones from a cellphone operating in bluetooth mode. The device is universal in nature in that it is designed to enable unlocking for any automobile manufacturer's vehicle that uses an oem keyfob transmitter.

4 Claims, 4 Drawing Sheets

FIGURE 1  High Gain DTMF Decoder

FIGURE 2 (UNIVERSAL MODULE)

STAND ALONE BLUE TOOTH ENABLED CAR DOOR UNLOCKER MODULE

RELATED APPLICATIONS

The present application is related to U.S. Pat. No. 6,194,991, issued Feb. 27, 2001, included by reference herein.

The present application is related to U.S. Pat. No. 6,577,226, issued Jun. 10, 2003, included by reference herein.

The present application is related to U.S. Pat. No. 6,606,492, issued Aug. 12, 2003, included by reference herein.

The present application is related to U.S. Pat. No. 6,789,003, issued Sep. 7, 2004, included by reference herein.

The present application is related to U.S. Pat. No. 6,853,853, issued Feb. 8, 2005, included by reference herein.

The present application is related to U.S. Pat. No. 7,034,655, issued Apr. 25, 2006, included by reference herein.

The present application is related to U.S. Pat. No. 7,116,242, issued Oct. 3, 2006, included by reference herein.

The present application is related to U.S. Pat. No. 7,119,709, issued Oct. 10, 2006, included by reference herein.

The present application is related to U.S. Pat. No. 6,617,975, issued Sep. 9, 2003, included by reference herein.

The present application is related to U.S. Pat. No. 6,031,465, issued Feb. 29, 2000, included by reference herein.

The present application is related to U.S. Pat. No. 7,167,076, issued Jan. 23, 2007, included by reference herein.

FIELD OF THE INVENTION

The present invention relates to a car door unlocker and, more particularly, to a car door unlocking device that is controlled by a Blue tooth enabled cell phone.

BACKGROUND OF THE INVENTION

The problem being that a driver locks himself out of his automobile by losing his keys or leaving the keys in the transmission. This problem has been addressed over the years in two distinct ways. The first way has been to create an aftermarket solution that would integrate with the car door locking system in an invasive manner. Only some individuals with technical knowledge and experience as well as alarm installers and automotive mechanics would be qualified to install the unlocking aftermarket product with a degree of competency. The second way of addressing this issue is to create a stand alone aftermarket product where the consumer could go to a retailer, purchase the product and install the product in their automobile without interfering with the automobile's electronic and door unlocking infrastructure. U.S. Pat. Nos. 6,617,975 and 6,031,465 address this problem with an integrated solution of a reed switch keypad configured with the embedded electronics of a car manufacturer's rf transmitter. While such a solution offers the user a competent way of regaining access into their vehicle, it has limitations in that the invention is specific to only one car manufacturer. The embedded rf transmitter has a rolling code that is proprietary and the device cannot be used on other types and brands of automobiles by the user.

The present invention attempts to address this limitation issue as well as take advantage of the prevailing trend of bluetooth technology in the consumer electronics market. The invention is a stand alone device. It is operated with a user's bluetooth enabled cellphone and has the capability of being transferrable to most cars that have an oem rf stand alone keyfob transmitter. In this embodiment the transmitters electronics are left alone. The keyfob body of the transmitter is integrated with a solenoid actuator that literally pushes the unlock button on the keyfob.

This created module is able to plug into a universal module that is operated with a bluetooth cellphone. The invention uses a dtmf decoder to decode the audio signals generated by the cellphone keypad. After the dtmf decoder board decodes the tones it drives a relay to the solenoid to unlock the car door. The plug in feature offers up the ability for many different automobiles to be serviced by this invention with the user only having to purchase the plug in module that is custom fitted to the particular car's oem keyfob transmitter.

Solution Number One: Tap-a-Lock System.

Description: a microphone module is adhered to a side window panel. The module is connected by wire to a microprocessor that is in turn wired to the car door locks. Tapping a certain morse code like signal on the window panel will tell the microprocessor to actuate and open the car door locking system.

Solution Number Two: Reed Switch Key Pad System.

Description: a set of reed switches that have a corresponding number that are wired into a microprocessor. A code is inputted into the microprocessor that is comprised of any combination of the reed switches. The microprocessor is also wired into a car manufacturers keyfob.

When a magnet is passed over the reed switches that constitute the code the microprocessor reads the code and closes the unlock circuit on the keyfob to open the door.

Solution Three: Telephonic Unlocker Pager

Description: a module with an rf receiver is wired into the car door unlocking system. When the module is called by any telephone it unlocks the car door.

Solution Four: Pop-a-Lock System

Description: When a driver locks key in car he calls a mobile mechanic to come and unlock the car door.

Shortcomings of Solution Number One: Tap-a-Lock System.

The tap-a-lock module requires invasive wiring into the car by a third party. If system develops trouble car must be taken back to installer for service. If car is ever sold the system would have to be removed by the installer requiring additional cost to owner.

Shortcomings of Solution Number Two: Reed Switch Key Pad System.

The car manufacturers keyfob circuitry is wired into the microprocessor. It is not interchangeable with other car manufacturer keyfobs.

Shortcomings of Solution Three: Telephonic Unlocker Pager

Invasive installation into the car door unlocking system. A monthly subscription for the telephone paging service to operate the rf module.

Shortcomings of Solution Four: Pop-a-Lock System

Time spent waiting for a mobile mechanic to come and open the car door. Cost of unlocking service. The automobile might be in a location where the mobile unlocking service is unavailable.

It would be advantageous to provide a . . . car door locking device that is easy to install, requires no technical knowledge and is completely independent of the automobile's electronics.

It would also be advantageous to provide a . . . car door unlocking device that has the capability of unlocking any car manufacturer's automobile door and for the user to be able to use it on any car/truck he owns.

It would further be advantageous to provide a . . . car door unlocking device where the user can easily program a password to access the unlocking capability of the device. The password can be changed from the outside of the car without the user touching the device at all.

SUMMARY OF THE INVENTION

In accordance with the present invention, there is provided . . . an unlocking device for automobiles that is able to be mounted on the interior of an automobile's rear window to facilitate reentry inside the automobile once a driver is locked out. The unlocking device is rectangular in shape and is mounted on the glass with suction cups. It is a stand alone module that is non evasive of the oem electronics of the automobile. The device is designed to receive dtmf tones from a cellphone operating in bluetooth mode. The tones from the cellphone are decoded by an integrated dtmf decoder board within the module. The dtmf tones are sent through a bluetooth module that is paired with the user's cellphone for bluetooth connectivity. The bluetooth module is connected to the dtmf decoder board to send the received dtmf tones into an audio input on the dtmf decoder board. Once the dtmf decoder board receives the dtmf tones and decodes them it drives a relay to a plug in module that houses the automobile's particular keyfob transmitter. The plug in module has an integrated push/pull solenoid which receives the relay signal from the dtmf decoder board and pushes the unlock button on the keyfob transmitter. This unlocking process is initiated by the user retrieving a magnet from the exterior of the automobile and swiping it against the glass surface under which the stand alone module is affixed by suction cups. A magnetic proximity switch within the stand alone module is then activated. It will then turn on a timing circuit that will in turn power on the stand alone module's dtmf decoder board and the bluetooth module. Once the unlocking operation is complete the timing circuit will turn off power to the dtmf decoder board and the bluetooth module to save battery life.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
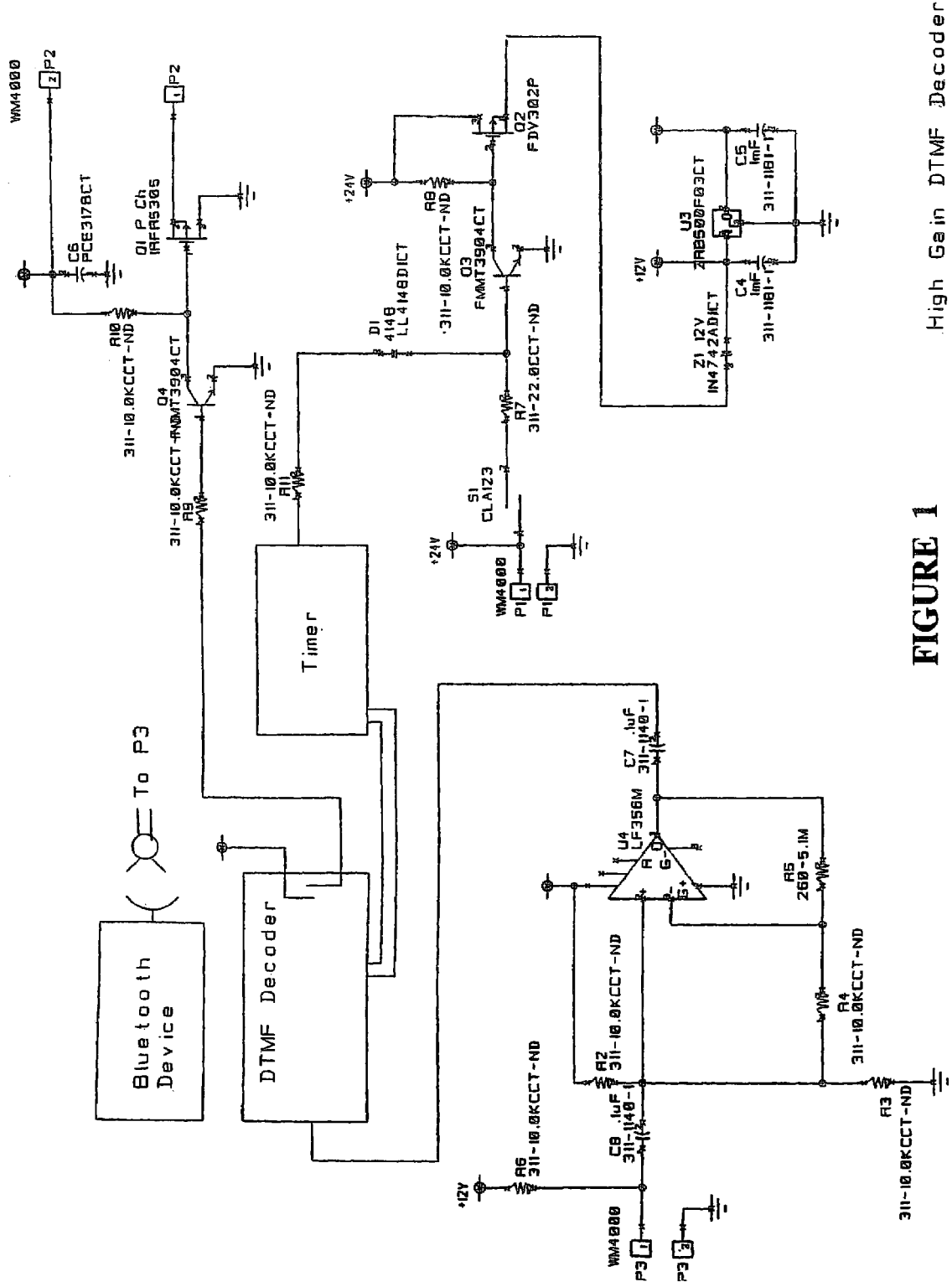
FIG. 1 is an electrical wiring diagram view of the major components of the universal module and how they connect electrically.
Figure 2:
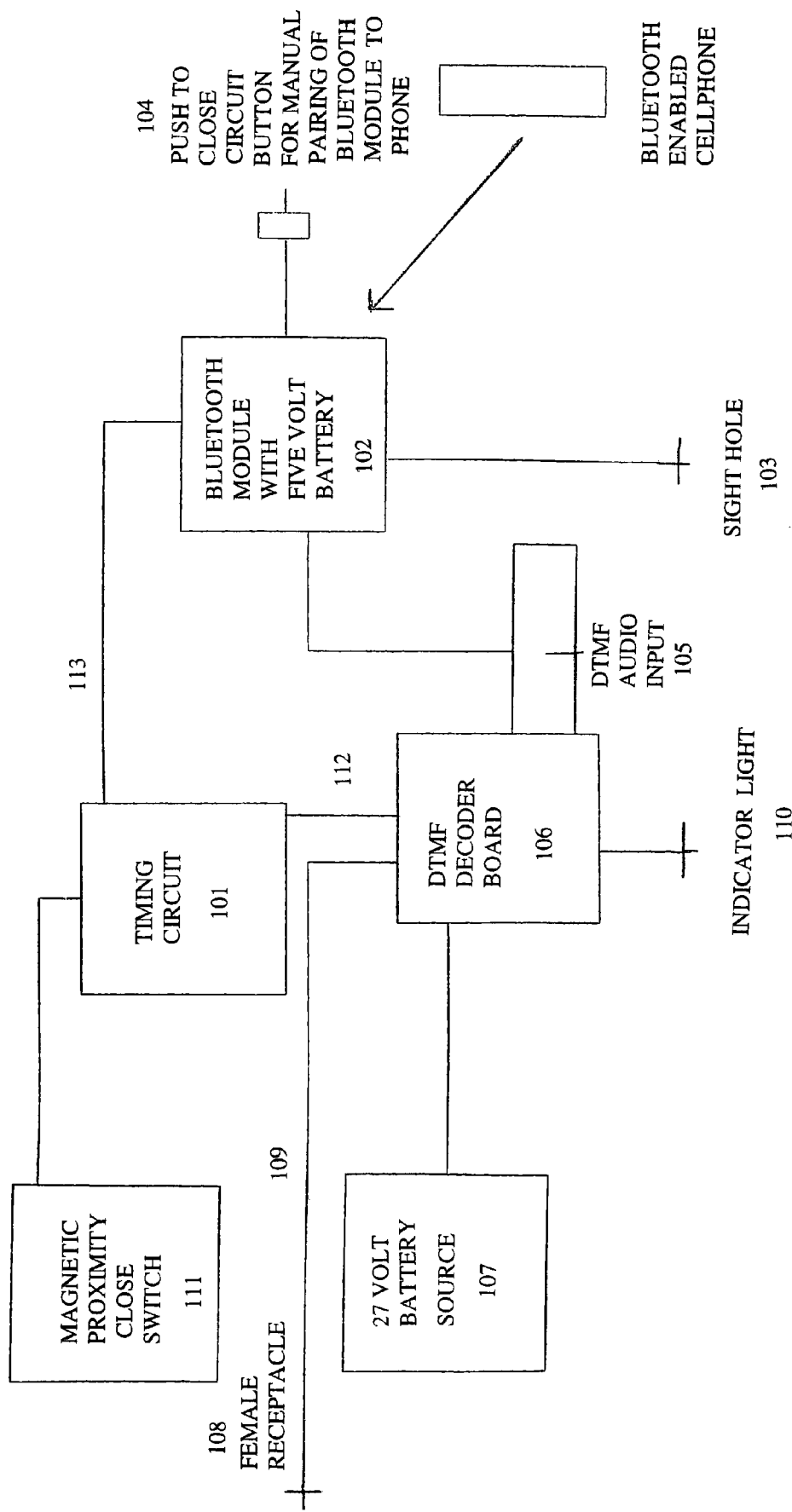
FIG. 2 is a cut away view of the universal module showing the arrangement of four of the major components.
Figure 3:
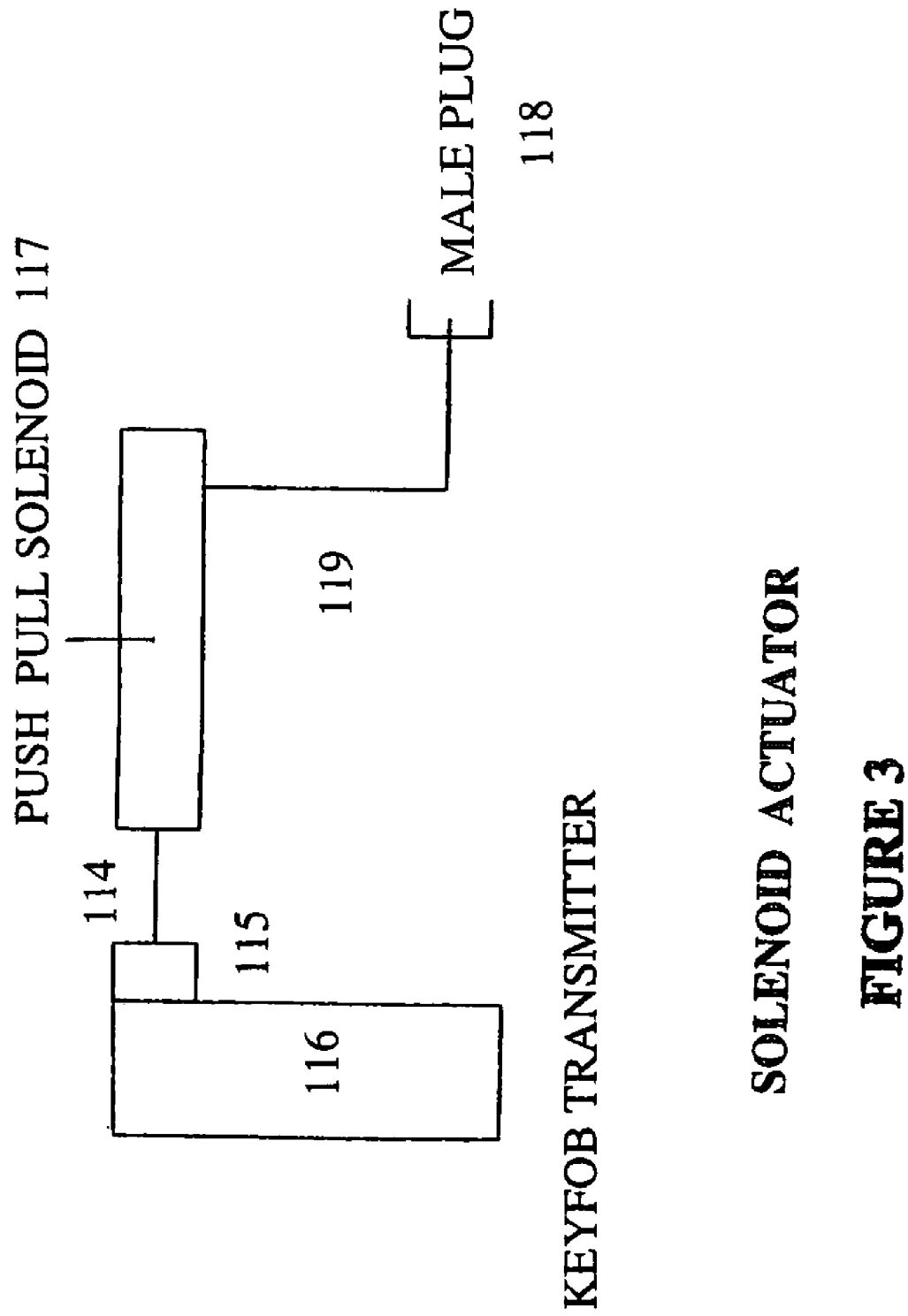
FIG. 3 is a detail view of the second module that houses the push/pull solenoid and the keyfob oem transmitter.
Figure 4:
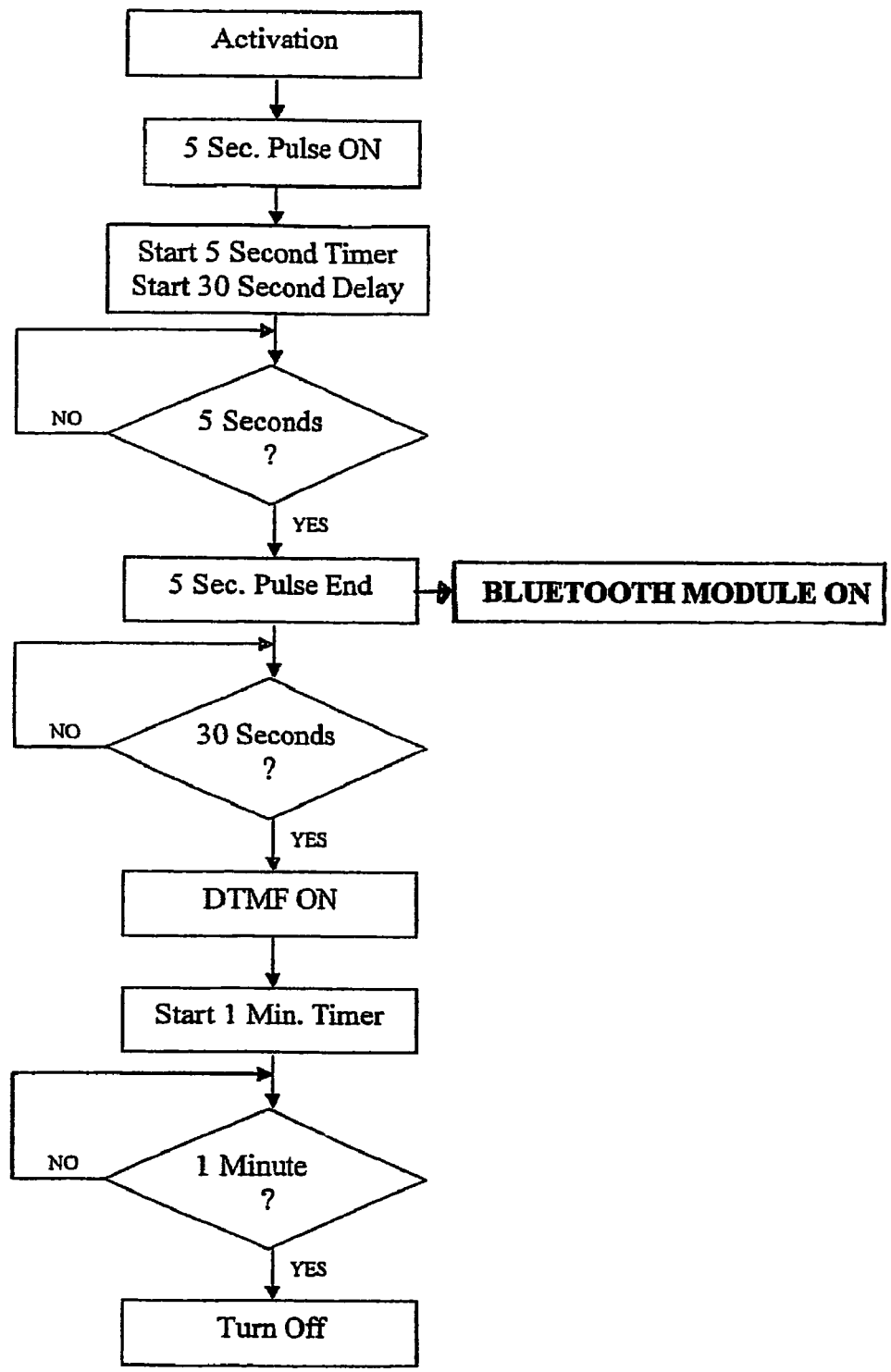
FIG. 4 is a flow chart view of the timing circuit that powers the device on and off.

The invention is composed of five central components which create two separate modules.

The five components are as follows:
1) Magnetic proximity switch 111 (reed switch)
2) Timing circuit 101
3) Bluetooth module 102
4) Dtmf decoder board 5) Solenoid actuator 117

FIG. ONE shows the electrical relationship between the major components of the invention (wiring diagram).

The bluetooth module 102, dtmf decoder board 106, timing circuit 101, and reed switch constitute the first module known as the Universal Module. (FIG. TWO) The second module is composed of a custom enclosure that accommodates a particular car manufacturer's keyfob oem transmitter that has an integrated push pull type solenoid linear actuator. (FIG. THREE). This module is made to plug into the Universal Module. Another embodiment of this application would be to have the solenoid actuator 117 integrated with the components of the Universal Module and to have only the keyfob oem transmitter in it's custom enclosure plug into the Universal Module.

The first primary component of the invention is the magnetic proximity switch 111 or reed switch. It is located on the inside face of the Universal Module and faces the automotive glass. When a magnet is brought close to it the reed switch will close and turn on a timing circuit 101 (FIG. FOUR) that will begin the operation of the device. The magnet can be located anywhere on the car's body for immediate retrieval when the driver initiates the unlocking process.

The second primary component is the timing circuit 101. When the timing circuit 101 is turned on by the reed switch 111, two timing sequences are started.

The first sequence is a five second timer that ends in the turning on of the bluetooth module 102. The second sequence is a thirty second delay timer that will turn on the dtmf decoder board 106. This delay is created to give the user time to connect to the bluetooth module 102 with a bluetooth enabled cellphone that has been previously paired to the bluetooth module 102. When the dtmf decoder board 106 comes on the user will be ready with his cellphone in bluetooth mode to send the cellphone unlock code through the bluetooth module 102 to the dtmf decoder board's audio input. When the dtmf decoder board 106 receives the dtmf cellphone generated tones, it decodes the tones and drives a relay to the solenoid actuator 117 to push the keyfob oem transmitter unlock button 114 that will open the driver side car door. When the dtmf decoder board 106 comes on the timing circuit 101 will start a one minute timer that will turn the dtmf decoder board 106 off after one minute. Five seconds after the dtmf board turns off the timing circuit 101 will send a pulse to turn off the bluetooth module 102 thus preserving battery life for the dtmf decoder board 106 and the bluetooth module 102.

The third primary component is the bluetooth module 102. The bluetooth module 102 is a stand alone module that is powered by a five volt battery source with a regulator. The bluetooth module 102 can be supplied by any one of many manufacturers in the market. This module is manufactured for any cellphone that has built in bluetooth connectivity. The bluetooth module 102 needs to be paired to the cellphone before operation. This is accomplished by tapping into the pairing circuit inside the module with an electrical wire that is affixed to a push to close circuit button 104 that is built into the side panel of the Universal Module 104. To pair the bluetooth enabled cellphone to the bluetooth module 102 the user must first press and hold the push to close circuit button 104 on the side panel of the Universal Module for approximately seven seconds while looking into the sight hole 103 at the end panel of the Universal module. A flashing red and blue light can be seen in the sight hole 103 when the bluetooth module 102 enters the pairing stage. A four or more digit pin number is required by the bluetooth module 102 in order to successfully pair the cellphone to the bluetooth module 102. Once the pin number is entered via the cellphone pairing is initiated and the cell phone joins to the bluetooth module 102. When pairing is complete the bluetooth module 102 must be turned off for subsequent proper operation by holding the push to close circuit button 104 for approximately five seconds to turn off the bluetooth module 102. Another way that the bluetooth module 102 and cellphone could be paired is to design the timing circuit 101 to turn on the pairing circuit in the bluetooth module 102 with a period of five seconds to initiate pairing between the bluetooth module 102 and the cellphone from outside the vehicle. After the five second time elapses the thirty second delay timer for the dtmf module would begin if pairing is not initiated. If pairing is initiated the thirty second delay timer would begin after the pairing process. The bluetooth module 102 can receive any sequence or combination of numbers from the cellphone keypad that can serve as the unlocking code. The bluetooth module 102 receives the cellphone's dtmf tones as an audio signal. This audio signal is fed into the dtmf decoder board's audio input 105 for decoding and driving the unlock relay for the solenoid actuator 117. Another embodiment of the bluetooth feature would be to use a bluetooth chip that receives no audio dtmf tones but rather an electrical signal from the cell phone whereby a relay is actuated after signal is received to pulse the solenoid actuator 117.This embodiment would work without a dtmf decoder board 106. The final alternative embodiment would be where the user holds his cellphone up to the automobile glass window with the cellphone in speaker mode. The dtmf decoder board 106 would use a filter to negate distortion of the audible dtmf tones going through the glass from the cellphone speaker and allow the dtmf board to decode and drive a relay to the solenoid actuator 117.

The fourth primary component is the dtmf decoder board 106. The dtmf decoder board 106 is made by Intuitive Electronics as a servant component in various electronic applications. It is designed to receive any combination up to eight dtmf tones and to activate a circuit that will be a relay (in this case an unlock relay) to turn on an electrical apparatus (in this case the solenoid actuator 117). The dtmf board must be preprogrammed by the user to receive the user's selected dtmf code that is inputted by the cellphone keypad. The programming sequence is as follows:

1) Apply power to the dtmf decoder board 106
2) For four seconds the yellow led will blink. Within that four second window press the pound sign # to enter the programming mode. While in the programming mode the yellow led will remain on except when a valid dtmf digit is being decoded.
3) Select the desired mode for programming. On this particular board the programming mode will be mode 2.
4) Press the total number of password digits desired. Valid entries are 0-9.
5) Enter each digit of the password. It will be the number of password digits requested in step four. Valid password digits are 0123456789ABC*#

This constitutes the programming sequence for the dtmf decoder board 106.

If a user wishes to change the password (unlock code) when the dtmf board is powered on and the yellow led light flashes, the pound # sign must be entered and then the previously user configured unlock code is entered after that to start the reprogramming sequence.

Once the dtmf decoder board 106 is programmed it is ready to receive the audio signals from the bluetooth module 102 during the unlocking phase. The invention with the outside (of the automobile) pairing capability for the bluetooth module 102 as well as the outside of automobile capability of changing the password to the dtmf board would allow the user to use any bluetooth enabled cellphone to gain reentry back into his automobile with the assurance that he can change both pairing and password codes for his future personal access.

The fifth primary component is the solenoid actuator 117. The solenoid actuator 117 FIGURE THREE is the second module that plugs 118 into the Universal Module 108. It is composed of an integrated push pull solenoid with an actuating rod 114 that rests on top of the unlock button of any car manufacturer's keyfob oem transmitter. 115. The keyfob is seated in a custom molded enclosure that will be manufactured to fit the shape of the particular keyfob used by the driver. The unlock button on the keyfob will align with the solenoid's push pull rod end. As previously stated, another variation of this application would be to integrate the push pull solenoid into the envelope of the Universal Module and have only the keyfob in its custom molded enclosure to plug into the Universal Module in alignment with unlock button and solenoid actuation rod.

Unlocker Mode Operation

A) Driver locks self outside of car
B) Driver retrieves magnet located on outside of car.
C) The driver swipes the magnet against the reed switch section of the suction cup mounted Universal Module that is mounted on the inside of the automobile glass rear window initiating two timing sequences to turn on bluetooth module 102 and dtmf decoder boardD) User sets phone to bluetooth connection mode.
E) After five seconds the bluetooth module 102 turns on. The user's cell phone will connect to the bluetooth module 102 when user depresses the cell phone connect button. When the bluetooth module 102 connects with the cellphone the user waits for the dtmf decoder board 106 to come on (30 second delay) with the dtmf decoder board 106 yellow led flashing for four seconds after which the user can enter their programmed unlock code through their cell phone to the bluetooth module 102 and then to the dtmf decoder board 106 for decoding and driving the unlock relay to the solenoid actuator 117.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A wireless vehicle door unlocking system for allowing a driver using a Bluetooth® enabled cellphone to regain entry into a vehicle after being locked out, the vehicle having an existing electronic door locking system, the vehicle door unlocking system comprising:

a first signal receiving module having a housing adapted to be removably secured to a glass surface that faces the interior of the vehicle, said first signal receiving module containing a first power supply, a magnetic proximity switch coupled with said first power supply, a timing circuit coupled with said magnetic proximity switch, a Bluetooth® module coupled with said timing circuit and powered by a second power supply, and a DTMF decoder board having a circuit coupled with said Bluetooth® module and said timing circuit for receiving and decoding DTMF tones representing an unlock code signal transmitted from the Bluetooth® enabled cellphone, said Bluetooth® module paired with the Bluetooth® enabled cellphone for wireless communication therebetween;

a second signal transceiver module having a signal receiving circuit coupled wirelessly with said DTMF decoder circuit, a solenoid switch coupled with said signal receiving circuit, and an unlock signal transmitting circuit coupled with said solenoid switch and coupled wirelessly with the electronic door locking system of the vehicle;

a magnet member to be manually positioned by the driver on the glass surface exterior of the vehicle in close proximity to said first signal receiving module in the event of being lock out to actuate said magnetic proximity switch for initiating an unlocking operation; wherein said magnetic proximity switch completes a circuit responsive to close proximity of said magnet to supply power from said first power supply to said timing circuit to activate said DTMF decoder board circuit and said Bluetooth® module for a period of time sufficient to receive DTMF tones representing an unlock code signal transmitted from the Bluetooth® enabled cellphone, decode the DTMF tones, and responsive thereto, to actuate said solenoid switch to complete said unlock signal transmitting circuit to wirelessly transmit an unlock signal to the electronic door locking system of the vehicle to open at least one vehicle door; and after a predetermined period of time, said timing circuit turns off power from said first power supply to said DTMF decoder board circuit and said Bluetooth® module.

2. A wireless vehicle door unlocking system according to claim 1, wherein said second signal transceiver module has a housing containing said signal receiving circuit, and a push button transmitter having an unlock button, said unlock signal transmitting circuit contained within said push button transmitter and coupled wirelessly with the electronic door locking system of the vehicle; and said solenoid switch includes a solenoid with a reciprocating plunger, said solenoid coupled with said signal receiving circuit and said reciprocating plunger engageable with said unlock button in an extended position upon said signal receiving circuit receiving said unlock code signal transmitted from the Bluetooth® enabled cellphone, and responsive thereto, to depress said unlock button to activate said unlock signal transmitting circuit to wirelessly transmit an unlock signal to the electronic door locking system of the vehicle to open at least one vehicle door.

3. A wireless vehicle door unlocking system for allowing a driver using a Bluetooth® enabled cellphone to regain entry into a vehicle after being locked out, the vehicle having an existing electronic door locking system, the vehicle door unlocking system comprising:

a first signal receiving module having a housing adapted to be removably secured to a glass surface that faces the interior of the vehicle, said first signal receiving module containing a first power supply, a magnetic proximity switch coupled with said first power supply, a timing circuit coupled with said magnetic proximity switch, a Bluetooth® module coupled with said timing circuit and powered by a second power supply, and a DTMF decoder board having a circuit coupled with said Bluetooth® module and said timing circuit for receiving and decoding DTMF tones representing an unlock code signal transmitted from the Bluetooth® enabled cellphone, said Bluetooth® module paired with the Bluetooth® enabled cellphone for wireless communication therebetween;

a receptacle on said signal receiving module housing electrically coupled with said DTMF decoder board;

a second signal transceiver module having a housing containing a signal receiving circuit, a solenoid switch coupled with said signal receiving circuit, an unlock signal transmitting circuit coupled with said solenoid switch and coupled wirelessly with the electronic door locking system of the vehicle, and a plug on said signal transceiver module housing electrically coupled with said signal receiving circuit, said plug removably received in said receptacle of said signal receiving module housing to couple said signal receiving circuit with said DTMF decoder circuit of said signal receiving module;

a magnet member to be manually positioned by the driver on the glass surface exterior of the vehicle in close proximity to said first signal receiving module in the event of being lock out to actuate said magnetic proximity switch for initiating an unlocking operation; wherein said magnetic proximity switch completes a circuit responsive to close proximity of said magnet to supply power from said first power supply to said timing circuit to activate said DTMF decoder board circuit and said Bluetooth® module for a period of time sufficient to receive DTMF tones representing an unlock code signal transmitted from the Bluetooth® enabled cellphone, decode the DTMF tones, and responsive thereto, to actuate said solenoid switch to complete said unlock signal transmitting circuit to wirelessly transmit an unlock signal to the electronic door locking system of the vehicle to open at least one vehicle door; and after a predetermined period of time, said timing circuit turns off power from said first power supply to said DTMF decoder board circuit and said Bluetooth® module.

4. A wireless vehicle door unlocking system according to claim 3, wherein said second signal transceiver module housing contains a push button transmitter having an unlock button, said unlock signal transmitting circuit is contained within said push button transmitter and coupled wirelessly with the electronic door locking system of the vehicle; and said solenoid switch includes a solenoid with a reciprocating plunger, said solenoid coupled with said signal receiving circuit and said reciprocating plunger engageable with said unlock button in an extended position upon said signal receiving circuit receiving said unlock code signal transmitted from the Bluetooth® enabled cellphone, and responsive thereto, to depress said unlock button to activate said unlock signal transmitting circuit to wirelessly transmit an unlock signal to the electronic door locking system of the vehicle to open at least one vehicle door.

\* \* \* \* \*